United States Patent
Lindoff et al.

(10) Patent No.: US 8,437,775 B2
(45) Date of Patent: May 7, 2013

(54) METHODS AND ARRANGEMENTS FOR ENABLING ESTIMATION OF A POSITION OF A MOBILE TERMINAL

(75) Inventors: Bengt Lindoff, Bjärred (SE); Niklas Andgart, Södrasandby (SE); Ari Kangas, Lidingö (SE); Johan Nilsson, Höllviken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/260,524

(22) PCT Filed: Mar. 27, 2009

(86) PCT No.: PCT/SE2009/050323
§ 371 (c)(1),
(2), (4) Date: Sep. 26, 2011

(87) PCT Pub. No.: WO2010/110709
PCT Pub. Date: Sep. 30, 2010

(65) Prior Publication Data
US 2012/0021769 A1 Jan. 26, 2012

(51) Int. Cl.
*H04W 24/00* (2009.01)

(52) U.S. Cl.
USPC ............. 455/456.1; 455/456.2; 455/456.6; 370/312; 370/329

(58) Field of Classification Search ........... 455/436, 455/445, 435.1, 403, 426.1, 456; 370/349, 370/337, 331, 335, 466, 312, 338, 329; 375/211; 342/457, 458, 363
See application file for complete search history.

(56) References Cited

U.S. PATENT DOCUMENTS

| | | | |
|---|---|---|---|
| 6,275,186 B1 * | 8/2001 | Kong | 342/363 |
| 2002/0072378 A1 * | 6/2002 | Gaal | 455/456 |
| 2002/0115448 A1 * | 8/2002 | Amerga et al. | 455/456 |
| 2003/0148774 A1 * | 8/2003 | Naghian et al. | 455/456 |
| 2006/0128399 A1 * | 6/2006 | Duan et al. | 455/456.5 |
| 2007/0104164 A1 * | 5/2007 | Laroia et al. | 370/338 |
| 2009/0286510 A1 * | 11/2009 | Huber et al. | 455/410 |
| 2009/0323596 A1 * | 12/2009 | Wigren et al. | 370/329 |

FOREIGN PATENT DOCUMENTS

| EP | 1 137 301 A1 | 9/2001 |
|---|---|---|
| WO | WO 2007/013850 A2 | 2/2007 |

OTHER PUBLICATIONS

International Search Report, PCT/SE2009/050323, Nov. 25, 2009.
Written Opinion of the International Searching Authority, PCT/SE2009/050323, Nov. 25, 2009.
International Preliminary Report on Patentability, PCT/SE2009/050323, Feb. 24, 2011.

* cited by examiner

*Primary Examiner* — Mahendra Patel
(74) *Attorney, Agent, or Firm* — Myers Bigel Sibley & Sajovec

(57) ABSTRACT

Methods and arrangements in a first network node, a second radio network node and a mobile terminal for enabling estimation of a position of a mobile terminal are provided. The first network node receives a request for estimating the position of the mobile terminal. The first network node determines a first set of radio network nodes including the second radio network node and two additional radio network nodes. The first network node determines positioning signals for transmission from radio network nodes of the first set to the mobile terminal. The first network node instructs each of the radio network nodes of the first set to transmit the positioning signal, associated therewith, to the mobile terminal.

30 Claims, 7 Drawing Sheets

METHODS AND ARRANGEMENTS FOR ENABLING ESTIMATION OF A POSITION OF A MOBILE TERMINAL

CROSS-REFERENCE TO RELATED APPLICATION

This application is a 35 U.S.C. §371 national stage application of PCT International Application No. PCT/SE2009/050323, filed on Mar. 27, 2009, the disclosure and content of which is incorporated by reference herein as if set forth in its entirety. The above-referenced PCT International Application was published in the English language as International Publication No. WO 2010/110709 on Sep. 30, 2010.

FIELD

The present invention relates to methods and arrangements for enabling estimation of a position of a mobile terminal in a cellular radio communication system. In particular, the present invention relates to a method and arrangement in a first network node for enabling estimation of a position of a mobile terminal, a method and arrangement in a second radio network node for enabling estimation of a position of a mobile terminal, and a method and arrangement in a mobile terminal for enabling estimation of a position of a mobile terminal.

BACKGROUND

In modern wireless telecommunication systems, such as in a LTE communication system, there exist methods for determining the position of a mobile device, or a mobile terminal, within the system. The accuracy of these methods varies. Nevertheless, these methods have enabled application developers and wireless network operators to provide position based services. For example, services such as guiding systems, shopping assistance, friend finder, presence services, community and communication services and other information services have been developed. In this manner, the user of the mobile device receives local information based on where the user is positioned, or located.

Moreover, in addition to the commercial services, governments in several countries have put requirements on the network operators to be able to determine the position of a mobile terminal placing an emergency call. The requirements make no difference between indoor and outdoor environment.

In outdoor environments, estimation of the position of the mobile terminal may be performed by using positioning systems, such as GPS (Global Positioning System) based methods like Assisted-GPS (A-GPS). The estimation of the position may also be performed by using the wireless telecommunication system itself. Among the known methods for estimation of the position of the mobile terminal by using the wireless telecommunication system, two main groups may be distinguished.

The first group comprises methods that are based on the radio base station, on which the emergency calling mobile terminal is camping. The estimation of the position is, thus, in this first group, based on Cell-ID or combination of cell-ID and Timing Advance (TA). The TA measurement principle is depicted in FIG. 1. Briefly, the travel time of radio waves from a radio base station 120 to a mobile terminal 170 and back is measured. This travel time is hereinafter referred to as round trip time, RTT. The distance, r (as indicated by the dashed arrow r), from radio base station to mobile terminal is the obtained as:

$$r = c\frac{TA}{2},$$

where TA is the round trip time and where c is the speed of light. The round trip time measurement alone defines a circle (a portion thereof is shown in FIG. 1 as denoted by 240), or if the inaccuracy is accounted for, a circular strip around the radio base station. By combining this information with the polygons 210, 220, 240 of the radio base station 120, left and right angles of the circular strip may be computed, thereby improving the accuracy of the determined measure of the position of the mobile terminal. Hence, the position of the mobile terminal is determined by calculating the intersection of the serving cell, i.e. area covered by the radio base station on which the mobile terminal is camping, and the circular strip. In several systems, among these the LTE system, TA may be used to identify the distance from the antenna at which a mobile terminal is positioned. This provides a distance, but it is not possible to determine where in a sphere (as defined by distance from the radio base station) or portion of a circular strip the mobile terminal is located. If RTT measurements determine that the mobile terminal is located 500 m from the base station, this is along an arc in a sector or the circumference of a circle.

The second group comprises methods that are based on time of arrival measurements, TOA, from multiple base stations as illustrated in FIG. 2. Expressed in mathematical formulas the time of arrival principle is:

$$t_R^1 = t_T^1 + \sqrt{(x-x_1)^2 + (y-y_1)^2}/c - b + v^1 \quad (1a)$$

$$t_R^2 = t_T^2 + \sqrt{(x-x_2)^2 + (y-y_2)^2}/c + b + v^2 \quad (1b)$$

$$t_R^N = t_T^N + \sqrt{(x-x_N)^2 + (y-y_N)^2}/c + b + v^N \quad (1N)$$

where:
$t_R^i$: Time of reception for ith base station (measured)
$t_T^i$: Time of transmission for ith base station
$x_i, y_i$: Coordinates of ith base station (known)
c: Speed of light
x, y: Coordinates of MS computed by solving equations (at MS or in network node)
b: Receiver clock bias
$v_i$: Measurement error of ith timing measurement When solving the equations (1a)-(1N) for the unknowns (x, y, b) with N>=3 and the geographical location of the base stations are appropriate, an estimation of the position of the mobile terminal is obtained in the form of coordinates x and y. One solution is to use numerical optimization solutions based on Taylor series expansions of equations (1a)-(1N). These methods are well known in the art and are, hence, not further elaborated herein.

Estimation of the position of the mobile terminal by using a TOA based method requires that the timing of at least three geographically dispersed base stations is measured. Therefore it is necessary to ensure that the SNR (signal to noise ratio) to said at least three base stations are strong enough so that each base station may be detected by the mobile terminal. Cellular system which reuse the same frequency band are designed to create strong isolation between cells, meaning that the signal from the serving base station should be strong while interference from the neighboring base stations should be minimized. In effect, the requirements for positioning and communication are conflicting. Since LTE is primarily a communication system, time measurements for positioning needs to be done at very low C/I (carrier to interference ratio)

to neighboring base stations, which puts high requirements on the mobile terminal receiver and also typically degrades the positioning accuracy.

The timing of dispersed base station may be measured using some of the known signals that are always transmitted from an LTE base station. For example, the timing may be based on synchronization signals or reference signals. In an LTE system, each radio frame comprises 10 subframes.

Synchronization signals are commonly transmitted in subframe 0 and 5. The primary synchronization signal is transmitted in the last OFDM symbol and the secondary synchronization signal is transmitted in the second last OFDM symbol of a subframe. There are 3 different PSS (Primary Synchronization Signal) sequences and 168 different SSS (Secondary Synchronization Signal) sequences. The sequence identities are used to distinguish different base stations (or cells). The identity of the base station can then be used to determine the reference signal sequence and its allocation in the time-frequency grid. The synchronization signals may, for example, occupy 62 resource elements in the centre of an allocated bandwidth.

Reference symbols are transmitted every subframe and over the entire bandwidth. Different base station may use six different shifts in frequency and 504 different signals exist. In practice, there is a reuse 3 pattern for reference symbols (2 TX antennas assumed). In low load, the interference could then be favorable for time measurements on reference symbols. In high load, however, the situation becomes similar to PSS/SSS for synchronization signals.

In U.S. Pat. No. 6,064,888, there is disclosed a method for determining a geographical position of mobile terminal operating in a TDMA/FDMA (GSM) system. Once a position determination is needed, the terminal is instructed to transmit a certain sequence at a certain time slot on a certain frequency, and base stations perform TOA or TDOA (Time Difference of Arrival). Then, the mobile terminal is forced to do an inter frequency HO and the procedure is repeated on that frequency. Once sufficiently many TOA/TDOA estimates are obtained, the position of the mobile terminal may be estimated. This approach introduces a need for the base stations to do the measurements and the mobile terminal to transmit the certain positioning signals.

SUMMARY

An object of the present invention is to provide a method for enabling estimation of the position of a mobile terminal in a cellular radio communication system, such as an LTE communication system.

According to an aspect of the invention, the object is achieved by a method in a first network node for enabling estimation of a position of a mobile terminal. A cellular radio communication system comprises the first network node, a second radio network node, a plurality of radio network nodes, and the mobile terminal. The second radio network node is managed by the first network node. In a step, the first network node receives, via the second radio network node, a request for estimating the position of the mobile terminal. In another step, the first network node determines a first set of radio network nodes comprising the second radio network node and two further radio network nodes. The two further radio network nodes are selected among said plurality of radio network nodes.

According to another aspect of the invention, the object is achieved by an arrangement in a first network node for enabling estimation of a position of a mobile terminal. A cellular radio communication system comprises the first network node, a second radio network node, a plurality of radio network nodes, and the mobile terminal. The second radio network node is managed by the first network node. The arrangement may comprise a receiving unit configured to receive, via the second radio network node, a request for estimating the position of the mobile terminal, and a processing unit configured to determine a first set of radio network nodes comprising the second radio network node and two further radio network nodes. The two further radio network nodes may be selected among said plurality of radio network nodes. Furthermore, the processing unit may be configured to determine positioning signals for transmission from radio network nodes, of the first set to the mobile terminal. Each of the positioning signals may be associated with a respective radio network node of the first set, and may be configured to instruct each of the radio network nodes of the first set to transmit the positioning signal, associated therewith, to the mobile terminal.

According to a further aspect of the invention, the object is achieved by a method in a second radio network node for enabling estimation of a position of a mobile terminal. A cellular radio communication system comprises the second radio network node, and the mobile terminal. The mobile terminal may be located in the vicinity of the second radio network node, such that a positioning signal may be transferred between the second radio network node, and the mobile terminal. In a step, the second radio network node determines a positioning signal, associated with the second radio network node, for transmission from the second radio network node to the mobile terminal. In another step, the second radio network node transmits the positioning signal to the mobile terminal.

According to still another aspect of the invention, the object is achieved by an arrangement in a second radio network node for enabling estimation of a position of a mobile terminal. A cellular radio communication system comprises the second radio network node, and the mobile terminal. The mobile terminal may be located in the vicinity of the second radio network node, such that a positioning signal may be transferred between the second radio network node, and the mobile terminal. The arrangement may comprise a processing unit configured to determine a positioning signal, associated with the second radio network node, for transmission from the second radio network node, to the mobile terminal, and a transmitting unit configured to transmit the positioning signal to the mobile terminal.

According to a still further aspect of the invention, the object is achieved by a method in a mobile terminal for enabling estimation of a position of a mobile terminal. A cellular radio communication system comprises a second radio network node, at least two further radio network nodes and the mobile terminal. The mobile terminal may be served by the second radio network node. A first set of radio network nodes may comprise the second network node and said at least two further radio network nodes. In a step, the mobile terminal receives from the second radio network node information about each respective positioning signal to be received from each respective radio network node of the first set of radio network nodes. In another step, the mobile terminal receives a respective positioning signal from each of the radio network nodes, of the first set. In a further step, the mobile terminal determines a respective timing estimate, based on each of the received positioning signals, for each of the positioning signals. Each timing estimate is indicative of the distance between the respective radio network node of the first set and the mobile terminal.

According to yet another aspect of the invention, the object is achieved by an arrangement in a mobile terminal for enabling estimation of a position of a mobile terminal. A cellular radio communication system comprises a second radio network node, at least two further radio network nodes and the mobile terminal. The mobile terminal may be served by the second radio network node. A first set of radio network nodes may comprise the second network node and said at least two further radio network nodes. The arrangement may comprise a receiving unit configured to receive from the second radio network node information about each respective positioning signal to be received from each respective radio network node of the first set of radio network nodes, and to receive a respective positioning signal from each of the radio network nodes, of the first set. Furthermore, the arrangement may comprise a processing unit configured to determine a respective timing estimate, based on each of the received positioning signals, for each of the positioning signals. Each timing estimate is indicative of the distance between the respective radio network node, of the first set and the mobile terminal.

Since the positioning signals are sent from the radio network nodes upon request from the mobile terminal, the mobile terminal (or other mobile terminals comprised in the cellular radio communication system) may determine information for estimation of the position of the mobile terminal. Such information may comprise timing estimates and/or geographical coordinates of the mobile terminal. In this manner, it may be assured that the positioning signal are only sent, or transmitted, from the radio network nodes to the mobile terminal when the position of a mobile terminal is to be estimated, or determined. As a result, a method for enabling estimation of the position of a mobile terminal in a cellular radio communication system is provided.

Further features of, and advantages with, the present invention will become apparent when studying the appended claims and the following description. Those skilled in the art realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
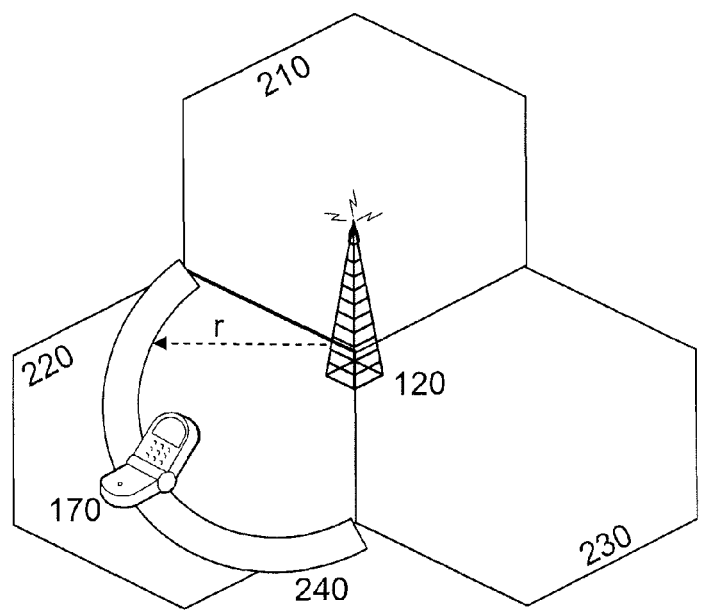
FIG. 1 shows a schematic overview of a radio base station and its associated cells.
Figure 2:
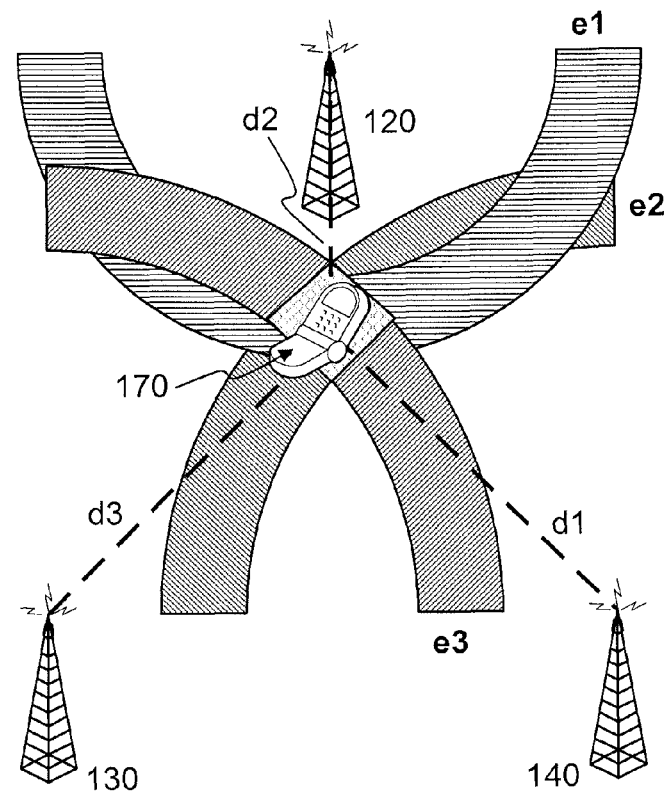
FIG. 2 shows a schematic illustration of a mobile terminal being located in the vicinity of three radio base stations.

Throughout the following description similar reference numerals have been used to denote similar elements, parts, items or features, when applicable.

Figure 3:
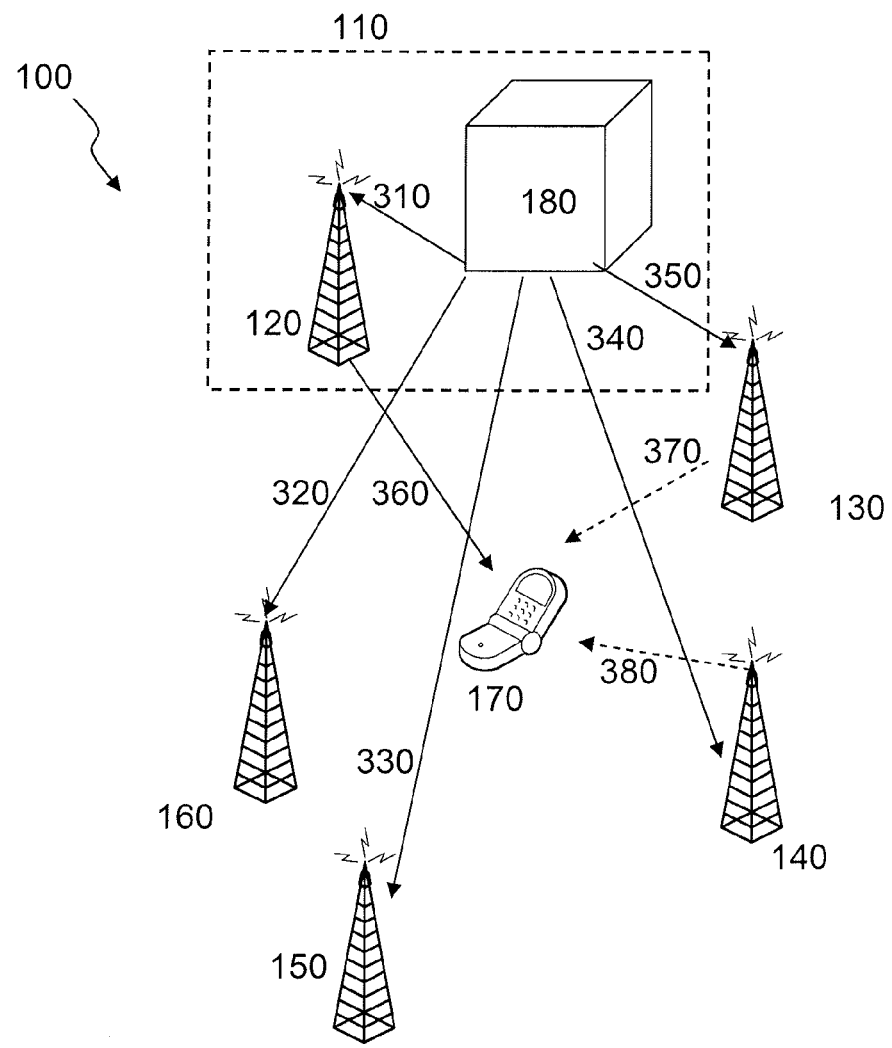
FIG. 3 shows a schematic overview of an exemplifying cellular radio communication system.

In FIG. 3, there is illustrated a schematic overview of an exemplifying cellular radio communication system 100, such as an LTE communication system, in which the present solution may be implemented. The LTE communication system comprises a first network node 180, a plurality of radio network nodes 120, 130, 140, 150, 160, such as radio base stations or eNBs, and a mobile terminal 170. The mobile terminal 170 is configured to be served by a second radio network node 120, i.e. the mobile terminal 170 camps on the second radio network node 120. In embodiments of the LTE communication system 100, a principal network node 110 comprises the first network node 180, such as a core network node, an MME, an HSS or the like. In further embodiments of the LTE communication system 100, the principal network node 110 comprises the second radio network node 120.

Moreover, arrow 360 denotes the connection between the mobile terminal 170 and the second radio network node 120 which serves the mobile terminal 170. Arrows 370 and 380 denote radio network nodes 130, 140, which are located such that signals are transferrable between these radio network nodes 130, 140 and the mobile terminal 170. It should further be noted that arrows 310, 320, 330, 340, 350 denote that the first network node 180 is connected, directly or indirectly, with radio network nodes 120-160. However, it shall be noted that some of the radio network nodes 120-160 may be managed by the first network node 180, while some of the radio network nodes 120-160 may not be managed by the first network node 180.

Figure 4:
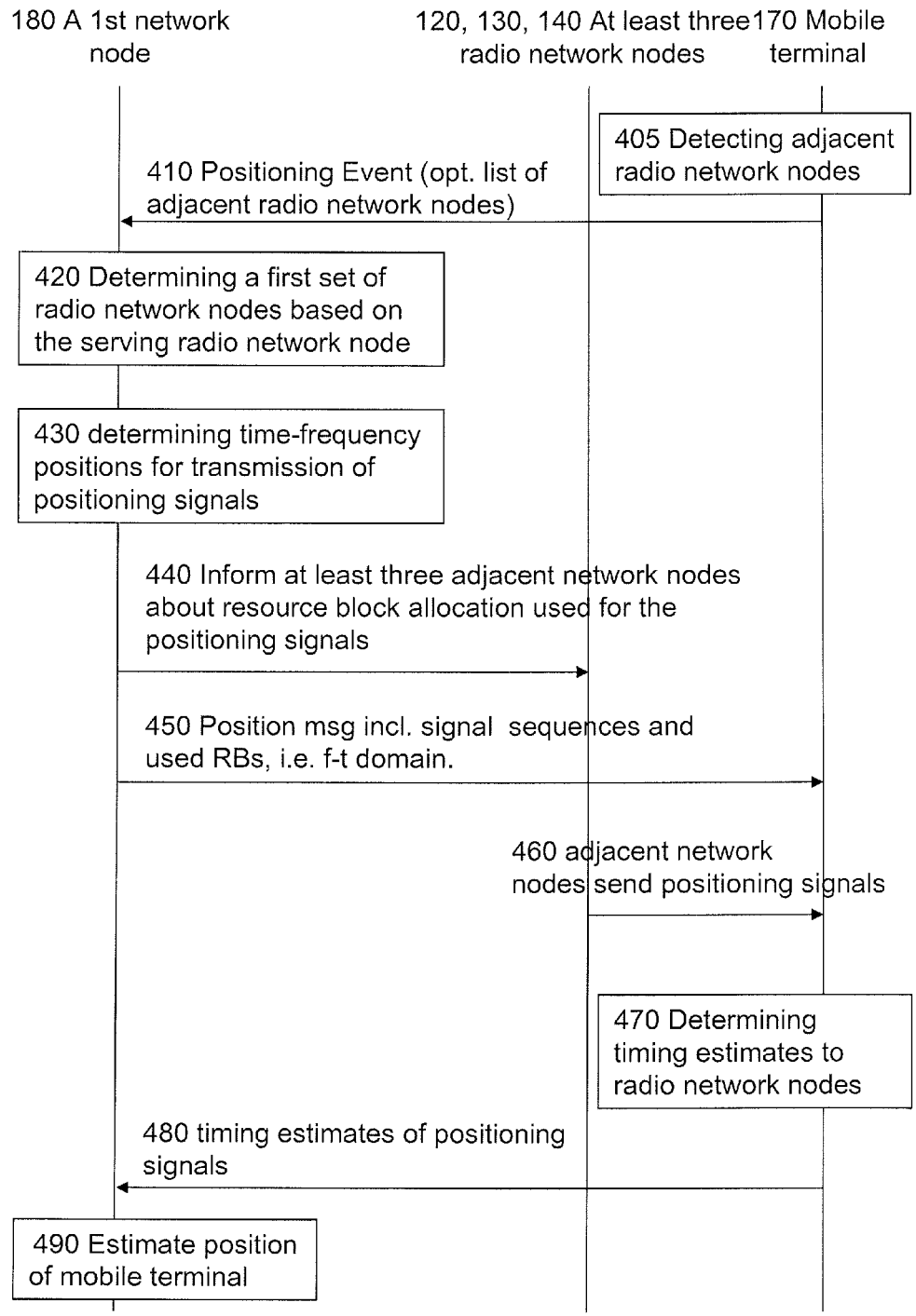
FIG. 4 shows a schematic combined signaling and flow chart of an embodiment of a method in the cellular radio communication system according to FIG. 3 for enabling estimation of the position of a mobile terminal.

In FIG. 4, there is shown a schematic, combined signaling and flow chart of an embodiment of a method for estimating a position of a mobile terminal when operating the LTE communication system 100 of FIG. 3. Some or all of the following steps may be performed.

In an optional step 405, the mobile terminal 170 detects neighboring, or adjacent, radio network nodes. For example, the mobile terminal may detect radio network nodes 140-160 if these are located such that a positioning signal may be transferred between any one of these radio network nodes and the mobile terminal 170. The mobile terminal 170 may, for example, detect neighboring radio network nodes by using normal cell search procedures, i.e. detection of PSS/SSS optionally followed by decoding of broadcast information from the PBCH channel. The detected radio network nodes may provide some information on how to choose the set of radio network node for sending of positioning signals. Such set of radio network node may, hence, comprise some or all of the detected network nodes and possibly some further radio network nodes, which were determined by, for example, the first network node 180.

In a step 410, the mobile terminal 170 sends a request for estimation of its position to the first network node 180. Expressed differently, the mobile terminal 170 generates a "positioning event", which is sent (transmitted) to the first network node 180. The "positioning event" may be triggered by a user, who for instance makes an emergency call by dialing 112, 911 or a number as is appropriate for the present situation, or launches a positioning application or service in the mobile terminal 170.

In a step 420, the request for estimation of the position is processed by the first network node 180. Optionally, the first network node 180 may request the mobile terminal to send, or transmit, a list of detected radio network nodes 130, 140 (see step 405). The list may aid the first network node 180 so that correct adjacent radio network nodes (sometimes referred to as cells) are informed about the positioning procedure (see next step). In this manner, the first network node 180 may determine a list of at least three radio network nodes 120, 130, 140 based on, for example, which radio network node 120 the mobile terminal 170 is served by. The determined list of at least three radio network nodes 120, 130, 140, being based on for example the first network node and/or the second network node, may mean that the determination is based on the position of and/or an identity code for the first network node and/or the second radio network node. The list of radio network nodes is hereinafter also referred to as a first set of radio network nodes. For example, the first network node 180 may determine a list of radio network nodes that are adjacent to or neighbors to a serving radio network node 120, or the second radio network node, (i.e. the mobile terminal 170 is served by the serving radio network node). This may be useful, because sometimes it may be assumed that such adjacent or neighboring radio base stations also may send a positioning signal to the mobile terminal 170. In contrast, there may be a risk that other radio base stations also managed by the first network node may not be able to successfully send a positioning signal to the mobile terminal, for example, due to radio transmission blocking buildings or the like. It may be preferred that the list of radio network nodes also includes the first network node.

In a step 430, the first network node 180 determines time-frequency positions for the positioning signals to be sent to the radio network nodes of the first set. The time-frequency positions for the positioning signals indicate at what resource blocks the positioning signal is to be transmitted.

In a step 440, the first network node 180 sends, or transmits, a first message to said at least three radio network nodes, wherein the first message comprises instructions to said at least three adjacent radio network nodes on how to send positioning signals. The first message may, thus, further comprise information about which resource blocks in the time-frequency space the positioning signal are to be sent on and, further, at what time instances, i.e. subframes. Moreover, the positioning signals used may preferably also be sent to said at least three radio network nodes. In some embodiments, the positioning signals are tied to the physical cell ID (PCI), i.e. once a radio network node 120, 130, 140 has received instructions to send or transmit a positioning signal, the radio network node knows which positioning signal to use because, as stated, the positioning signal is based on the physical cell ID (PCI).

In a step 450, the first network node 180 sends a second message to the mobile terminal 170. The second message comprises information about the positioning signal, i.e. signal sequences and/or resource blocks used in the time-frequency domain. The second message is, preferably, sent as an RRC message, which includes the list of adjacent radio network nodes (and typically also the first network node which serves the mobile terminal). In addition, the list of adjacent radio network nodes may also comprise the radio network nodes detected by the mobile terminal as well as neighbors of the detected radio network nodes 130, 140. The RRC message further includes time and frequency allocation of the positioning signals (resource blocks and subframes used). It may be preferred to use the same allocation (in terms of resource blocks and subframe numbers) for radio network nodes sending positioning signals, but this is not required. As a result, the mobile terminal 170 may receive and decode positioning signal from these radio network nodes 120, 130, 140.

In a step 460, said at least three radio network nodes 120, 130, 140 send positioning signals to the mobile terminal 170.

In a step 470, the mobile terminal 170 determines timing estimates of the positioning signals. For example, a timing estimate may be expressed in the time base of the radio network node 120, so that for radio network nodes 130, 140 the timing is expressed relative to the TOA of positioning signal from radio network node 120. The determination of the timing estimates typically includes matched filtering and peak detection as explained further below.

In a step 480, the mobile terminal 170 sends the timing estimates and, preferably, the PCI (or sequence numbers) for the detected positioning signals to the first network node 180, when the mobile terminal 170 has determined the timing estimates for said at least three network nodes.

In a step 490, the first network node 180 estimates the position of the mobile terminal 170 based on the timing estimates received from the mobile terminal 170.

Moreover, the first network node 180 may send a third message to said at least three radio network nodes, wherein the third message instructs said at least three radio network nodes to stop sending, or transmitting, positioning signals. Alternatively, said at least two radio network nodes may have been instructed to send positioning signals for a limited period of time, such as during 100 to 10 000 ms or other appropriate values.

In addition, or preferably alternatively, to the step 490, the mobile terminal estimates (in a step not shown in the FIG. 4) the position of itself based on radio network node coordinates received with the second message in the step 440. Then, in a further step, the mobile terminal sends the estimated position, for example in the form of geographical position coordinates, to the first network node 180.

In embodiments of the method in the cellular radio communication system 100, the positioning signal may be generated as QAM modulation on OFDM carriers or as overlaid (on OFDM carriers) CDMA signals. CDMA signals, like the so called Gold code based signals used by the GPS system, are well known to possess good properties for time of arrival estimation, namely good time resolution, autocorrelation and cross correlation properties.

Figure 5:
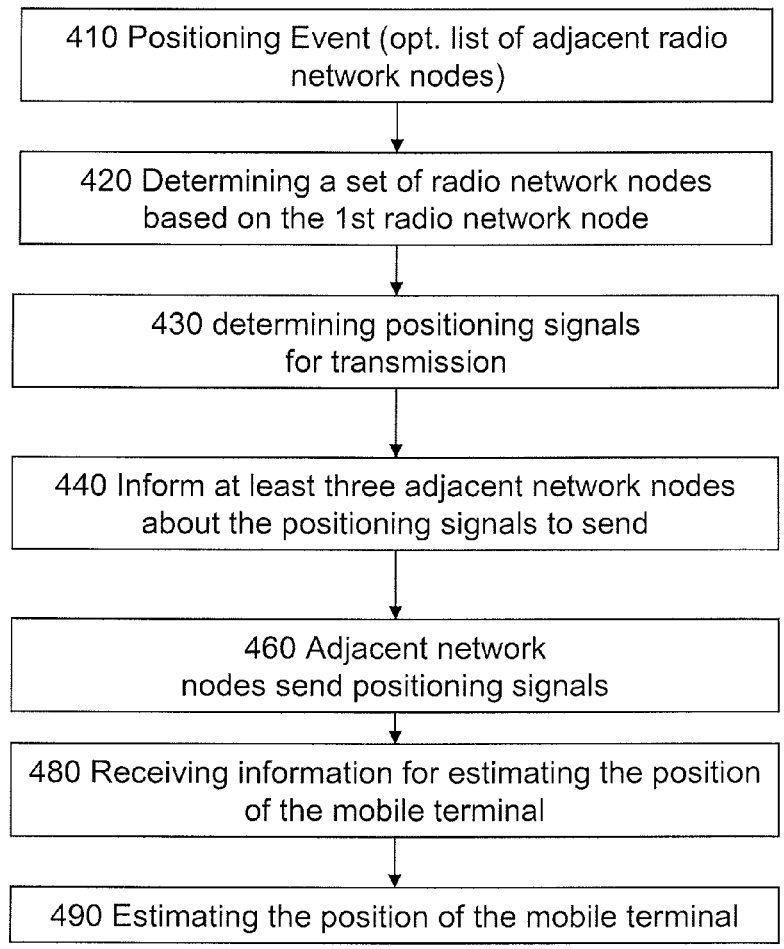
FIG. 5 shows a schematic flow chart of an embodiment of the method in the first network node for enabling estimation of the position of a mobile terminal.

Turning to FIG. 5, there is shown a schematic flow chart of an embodiment of the method in the first network node 180 for enabling estimation of a position of a mobile terminal 170. A cellular radio communication system 100 comprises the first network node 180, a second radio network node 120, a plurality of radio network nodes 130, 140, 150, 160, and the mobile terminal 170. The second radio network node 120 is managed by the first network node 180. Some or all of the following steps may be performed.

In a step 410, the first network node 180 receives, via the second radio network node 120, a request for estimating the position of the mobile terminal 170.

In a step 420, the first network node 180 determines, optionally based on at least one of the first network node 180 and the second radio network node 120, a first set of radio network nodes comprising the second radio network node 120 and two further radio network nodes 130, 140. The two further radio network nodes 130, 140 are selected among said plurality of radio network nodes 130, 140, 150, 160.

In some embodiments of the method in the first network node 180, the step of determining 420 the first set of network nodes further comprises receiving, optionally in conjunction with the request for estimating the position of the mobile terminal 170, from the mobile terminal 170 a list of radio network nodes detected by the mobile terminal 170. The determination of the first set of radio network nodes is further based on the received list of detected radio network nodes.

In a step 430, the first network node 180 determines positioning signals for transmission from radio network nodes 120, 130, 140 of the first set to the mobile terminal 170. Each of the positioning signals is associated with a respective radio network node of the first set. Optionally, the first network node 180 determines time-frequency positions for each of the positioning signals. The time-frequency positions for each positioning signal indicates what resource blocks to use for that particular signal.

In a step 440, the first network node 180 instructs each of the radio network nodes of the first set 120, 130, 140 to transmit the positioning signal, associated therewith, to the mobile terminal 170.

In some embodiments of the method in the first network node 180, two of the positioning signals, associated with two respective radio network nodes 120, 130, 140 of the first set of radio network nodes 120, 130, 140, have a cross correlation below a predetermined threshold. In this manner, interference between the positioning signals may be reduced. It may be preferred that the positioning signals (the sequences thereof) are configured such as to exhibit at least pseudo noise behavior, i.e. side cross correlation may be 1/sqrt(N), where N is the length of the sequence. In this example, the threshold may be alpha*1/sqrt (N), where alpha may be in the range of 1-10, preferably 2-4. Optionally, the positioning signals, determined in the step 430, are determined such that the signals a cross correlation below a predetermined threshold and/or are orthogonal or near orthogonal.

In embodiments of the method in the first network node 180, two of the positioning signals, associated with two respective radio network nodes 120, 130, 140 of the first set of radio network nodes 120, 130, 140 may be orthogonal or near orthogonal.

In some embodiments of the method in the first network node 180, the mobile terminal 170 is served by the second radio network node 120.

In some embodiments of the method in the first network node 180, the request for estimating the position of the mobile terminal 170 is received from the mobile terminal 170. Hence, it is the position of the request sending mobile terminal that is to be estimated, or determined. The request sending mobile terminal is the mobile terminal that places and emergency call, activates a positioning service or the like, i.e. the mobile terminal that generates the positioning event.

Additionally or alternatively, if it is the position of another mobile terminal than the request sending mobile terminal, then the other mobile terminal (a second mobile terminal) need to be informed about the positioning signals. The second mobile terminal may receive such information from the first network node or the second radio network node, which broadcasts the information the mobile terminals. At least one connected and/or idle mobile terminal receives a page message and reads a broadcast message informing the mobile terminal that "positioning measurements may be done with the following parameters etc.".

In an optional step, the first network node 180 transmits, via each of the radio network nodes of the first set, each of the determined positioning signals to the mobile terminal 170.

In an optional step 480, the first network node 180 receives, via the second radio network node 120, information for estimating the position of the mobile terminal 170 from the mobile terminal 170.

In an optional step 490, the first network node 180 estimates the position of the mobile terminal 170 based on the received information. In some embodiments of the method in the first network node 180, the information comprises information about timing estimates for each respective radio network node 120, 130, 140 of the first set of radio network nodes. Each respective timing estimate is indicative of the distance between each respective radio network node 120, 130, 140 and the mobile terminal 170. Thus, the first network node receives information which may be used to calculate (or estimate) the position coordinates of the mobile terminal 170. Optionally, the received information need to be combined with other information all ready available to the first network node. Such information may be the positions, i.e. geographical coordinates of the radio network nodes of the first set. In some embodiments of the method in the first network node 180, the information comprises information about the geographical position of the mobile terminal 170, wherein the geographical position is determined by the mobile terminal 170. Thus, the first network node receives geographical position coordinates of the mobile terminal 170.

In some embodiments of the method in the first network node 180, the time-frequency position of each positioning signal is based on at least one of load at each respective radio network node 120, 130, 140 of the first set and relative timing between network nodes 120, 130, 140 of the first set. In this manner, the positioning signals are made as orthogonal as possible and are selected such as to minimize interference.

In some embodiments of the method in the first network node 180, the determination of the time-frequency positions further is based on the physical cell identity for each respective radio network node 120, 130, 140 of the first set. As a result, the need for signaling between radio network nodes and to the mobile terminal is reduced.

In some embodiments of the method in the first network node 180, the determination of the positioning signals further is based on the physical cell identity for each respective radio network node 120, 130, 140 of the first set.

In some embodiments of the method in the first network node 180, at least one of the respective positioning signals is based on the subframe in which said at least one of the respective positioning signals is sent, whereby a respective positioning signal sent in one subframe differs from at least one respective positioning signal sent in another subframe. In this manner, average cross correlation between different sequences, i.e. positioning signals, is reduced.

In some embodiments of the method in the first network node 180, the first network node 110, 180 comprises a core network node 180, such as an E-SMLC, Evolved-Serving Mobile Location Center (which in previous system architectures corresponds to a Radio Network Controller, RNC).

Figure 6:
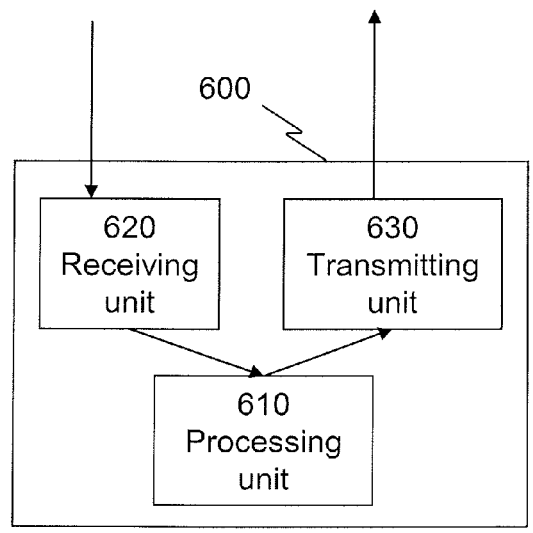
FIG. 6 shows a schematic block diagram of an embodiment of the arrangement in the first network node for enabling estimation of the position of a mobile terminal.

In FIG. 6, there is shown a schematic block diagram of an embodiment of the arrangement 600 in the first network node 180 for enabling estimation of a position of a mobile terminal 170. A cellular radio communication system 100 comprises the first network node 180, a second radio network node 120, a plurality of radio network nodes 130, 140, 150, 160 and the mobile terminal 170. The second radio network node 120 is managed by the first network node 180. The arrangement 600 may comprise a receiving unit 620 configured to receive, via the second radio network node 120, a request for estimating the position of the mobile terminal 170, and a processing unit 610 configured to determine, optionally based on the first network node 180 and/or the second radio network node 120, a first set of radio network nodes comprising the second radio network node 120 and two further radio network nodes 130, 140. The two further radio network nodes 130, 140 may be selected among said plurality of radio network nodes 130, 140, 150, 160. Furthermore, the processing unit 610 may be configured to determine positioning signals for transmission from radio network nodes 120, 130, 140 of the first set to the mobile terminal 170. Each of the positioning signals may be associated with a respective radio network node of the first set, and may be configured to instruct each of the radio network nodes of the first set 120, 130, 140 to transmit the positioning signal, associated therewith, to the mobile terminal 170. Optionally, the arrangement 600 further comprises a transmitting unit, or sending unit, 630.

In some embodiments of the arrangement 600 in the first network node 180 for enabling estimation of a position of a mobile terminal 170, the receiving unit 620 further is configured to receive, optionally in conjunction with the request for estimating the position of the mobile terminal 170, from the mobile terminal 170 a list of radio network nodes detected by the mobile terminal 170. The determination of the first set of radio network nodes is further based on the received list of detected radio network nodes.

In some embodiments of the arrangement 600 in the first network node 180 for enabling estimation of a position of a mobile terminal 170, the processing unit 610 further is configured to determine two of the positioning signals, associated with two respective radio network nodes 120, 130, 140 of the first set of radio network nodes 120, 130, 140, such that the two signals have a cross correlation below a predetermined threshold.

In some embodiments of the arrangement 600 in the first network node 180 for enabling estimation of a position of a mobile terminal 170, the processing unit 610 further is configured to determine two of the positioning signals, associated with two respective radio network nodes 120, 130, 140 of the first set such that the two signals are orthogonal or near orthogonal.

In some embodiments of the arrangement 600 in the first network node 180 for enabling estimation of a position of a mobile terminal 170, the mobile terminal 170 is served by the second radio network node 120.

In some embodiments of the arrangement 600 in the first network node 180 for enabling estimation of a position of a mobile terminal 170, the transmitting unit 630 further is configured to transmit, via each of the radio network nodes of the first set, each of the determined positioning signals to the mobile terminal 170.

In some embodiments of the arrangement 600 in the first network node 180 for enabling estimation of a position of a mobile terminal 170, the receiving unit 620 further is configured to receive, via the second radio network node 120, information for estimating the position of the mobile terminal 170 from the mobile terminal 170.

In some embodiments of the arrangement 600 in the first network node 180 for enabling estimation of a position of a mobile terminal 170, the processing unit 610 further is configured to estimate the position of the mobile terminal 170 based on the received information. In some embodiments of the arrangement 600 in the first network node 180, the information comprises information about timing estimates for each respective radio network node 120, 130, 140 of the first set of network nodes. Each respective timing estimate is indicative of the distance between each respective radio network node 120, 130, 140 and the mobile terminal 170. Thus, the first network node receives information which may be used to calculate (or estimate) the position coordinates of the mobile terminal 170. Optionally, the received information need to be combined with other information all ready available to the first network node. Such information may be the positions, i.e. geographical coordinates of the radio network nodes of the first set. In some embodiments of the arrangement 600 in the first network node 180, the information comprises information about the geographical position of the mobile terminal 170, wherein the geographical position is determined by the mobile terminal 170. Thus, the first network node receives position coordinates of the mobile terminal 170.

In some embodiments of the arrangement 600 in the first network node 180, the processing unit 610 further is configured to determine the time-frequency positions based on the physical cell identity for each respective radio network node 120, 130, 140 of the first set.

In some embodiments of the arrangement 600 in the first network node 180, the processing unit 610 further is configured to determine the positioning signals based on the physical cell identity for each respective radio network node 120, 130, 140 of the first set.

Figure 7:
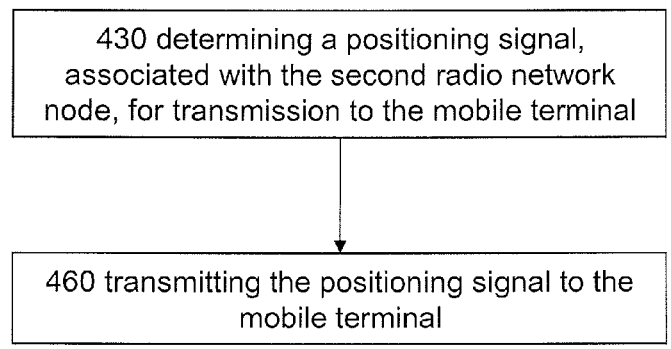
FIG. 7 shows a schematic flow chart of an embodiment of the method in the second radio network node for enabling estimation of the position of a mobile terminal.

Referring to FIG. 7, there is shown a schematic flow chart of an embodiment of the method in the second radio network node 120, 130, 140 for enabling estimation of a position of a mobile terminal 170. A cellular radio communication system 100 comprises the second radio network node 120, 130, 140 and the mobile terminal 170. The mobile terminal 170 may be located in the vicinity of the second radio network node 120, 130, 140 such that a positioning signal may be transferred between the second radio network node 120, 130, 140, and the mobile terminal 170. Some or all of the following steps may be performed.

In a step 430, the second radio network node 120, 130, 140 determines a positioning signal, associated with the second radio network node 120, 130, 140, for transmission from the second radio network node 120, 130, 140 to the mobile terminal 170.

In a step 460, the second radio network node 120, 130, 140 transmits the positioning signal to the mobile terminal 170.

In a further optional step, the second radio network node 120, 130, 140 receives from a first network node 180 instructions to transmit the positioning signal. The cellular radio communication system 100 further comprises the first network node 180.

In some embodiments of the method in the second radio network node 120, 130, 140, the step of determining 430 a positioning signal further comprises receiving from the first network node 180 a time-frequency position for the transmission of the positioning signal.

In some embodiments of the method in the second radio network node 120, the cellular radio communication system 100 further comprises two further radio network nodes 130, 140, wherein the step of determining 430 a positioning signal further comprises determining, optionally based on the second radio network node 120, a first set of radio network nodes comprising the second radio network node 120 and said two further radio network nodes 130, 140.

In a further optional step, the second radio network node 120 determines positioning signals for transmission from radio network nodes 120, 130, 140 of the first set to the mobile terminal 170. Each of the positioning signals may be associated with a respective radio network node of the first set.

In some embodiments of the method in the second radio network node 120, the mobile terminal 170 is served by the second radio network node 120.

In some embodiments of the method in the second radio network node 120, the step of determining 430 positioning signals further comprises determining a time-frequency position for each of the positioning signals.

In some embodiments of the method in the second radio network node 120, two of the positioning signals, associated with two respective radio network nodes 120, 130, 140 of the first set of radio network nodes 120, 130, 140, have a cross correlation below a predetermined threshold.

In some embodiments of the method in the second radio network node 120, the second radio network node comprises an eNodeB.

Figure 8:
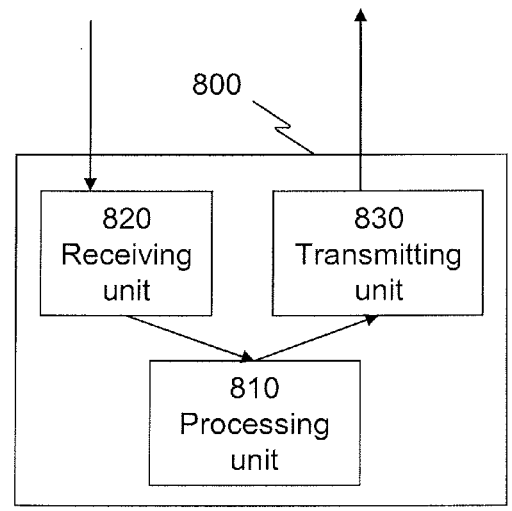
FIG. 8 shows a schematic block diagram of an embodiment of the arrangement in the second radio network node for enabling estimation of the position of a mobile terminal.

FIG. 8 shows a schematic block diagram of an embodiment of the arrangement 800 in the second radio network node 120, 130, 140 for enabling estimation of a position of a mobile terminal 170. A cellular radio communication system 100 comprises the second radio network node 120, 130, 140 and the mobile terminal 170. The mobile terminal 170 may be located in the vicinity of the second radio network node 120, 130, 140 such that a positioning signal may be transferred between the second radio network node 120, 130, 140 and the mobile terminal 170. The arrangement 800 may comprise a processing unit 810 configured to determine a positioning signal, associated with the second radio network node 120, 130, 140, for transmission from the second radio network node 120, 130, 140 to the mobile terminal 170, and a transmitting unit 830 configured to transmit the positioning signal to the mobile terminal 170. Optionally, the arrangement 800 may further comprise a receiving unit 820.

In some embodiments of the arrangement 800 in the second radio network node 120, 130, 140 for enabling estimation of a position of a mobile terminal 170, the receiving unit 820 further is configured to receive from a first network node 180 instructions to transmit the positioning signal. The cellular radio communication system 100 further comprises the first network node 180.

In some embodiments of the arrangement 800 in the second radio network node 120, 130, 140 for enabling estimation of a position of a mobile terminal 170, the receiving unit 820 further is configured to receive from the first network node 180 a time-frequency position for the transmission of the positioning signal.

In some embodiments of the arrangement 800 in the second radio network node 120, 130, 140 for enabling estimation of a position of a mobile terminal 170, the cellular radio communication system 100 further comprises two further radio network nodes 130, 140. The processing unit 810 is further configured to determine, optionally based on the second radio network node 120, a first set of radio network nodes comprising the second radio network node 120 and said two further radio network nodes 130, 140.

In some embodiments of the arrangement 800 in the second radio network node 120, 130, 140 for enabling estimation of a position of a mobile terminal 170, the processing unit 810 further is configured to determine positioning signals for transmission from radio network nodes 120, 130, 140 of the first set to the mobile terminal 170. Each of the positioning signals may be associated with a respective radio network node of the first set.

In some embodiments of the arrangement 800 in the second radio network node 120, 130, 140 for enabling estimation of a position of a mobile terminal 170, the mobile terminal 170 is served by the second radio network node 120.

In some embodiments of the arrangement 800 in the second radio network node 120, 130, 140 for enabling estimation of a position of a mobile terminal 170, the processing unit 810 further is configured to determine a time-frequency position for each of the positioning signals.

In some embodiments of the arrangement 800 in the second radio network node 120, 130, 140 for enabling estimation of a position of a mobile terminal 170, the processing unit is further configured to determine two of the positioning signals, associated with two respective radio network nodes 120, 130, 140 of the first set of radio network nodes 120, 130, 140, such that the signal have a cross correlation below a predetermined threshold.

In some embodiments of the arrangement 800 in the second radio network node 120, 130, 140 for enabling estimation of a position of a mobile terminal 170, the processing unit is further configured to determine two of the positioning signals, associated with two respective radio network nodes 120, 130, 140 of the first set such that the two positioning signal are orthogonal or near orthogonal.

Figure 9:
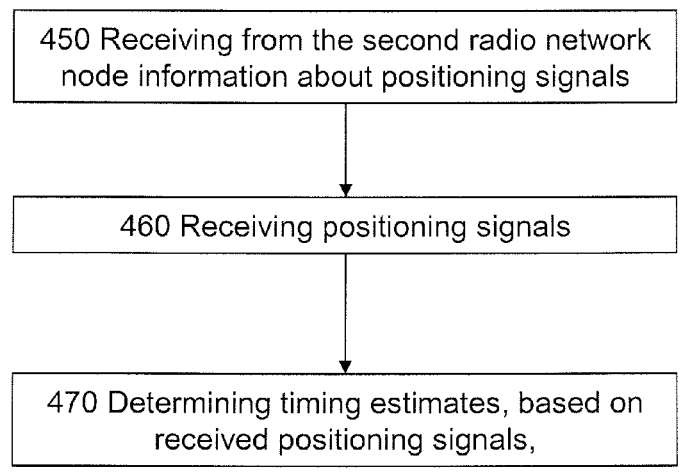
FIG. 9 shows a schematic flow chart of an embodiment of the method in a mobile terminal for enabling estimation of the position of the mobile terminal.

In FIG. 9, there is shown a schematic flow chart of an embodiment of the method in the mobile terminal 170 for enabling estimation of a position of a mobile terminal 170. A cellular radio communication system 100 comprises a second radio network node 120, at least two further radio network nodes 130, 140, and the mobile terminal 170. The mobile terminal 170 may be served by the second radio network node 120. A first set of radio network nodes may comprise the second network node 120 and said at least two further radio network nodes 130, 140. Some or all of the following steps may be performed.

In a step 450, the mobile terminal 170 receives from the second radio network node 120 information about each respective positioning signal to be received from each respective radio network node of the first set of radio network nodes 120, 130, 140.

In a step 460, the mobile terminal 170 receives a respective positioning signal from each of the radio network nodes 120, 130, 140 of the first set.

In a step 470, the mobile terminal 170 determines a respective timing estimate, based on each of the received positioning signals, for each of the positioning signals. Each timing estimate is indicative of the distance between the respective radio network node 120, 130, 140 of the first set and the mobile terminal 170.

In an optional step 405 (shown in FIG. 4), the mobile terminal 170 detects a plurality of radio network nodes 130, 140. Said plurality of radio network nodes 130, 140 may be located in the vicinity of the mobile terminal 170 such that the respective positioning signal is transferrable between the each of the radio network nodes of the first set of radio network nodes and the mobile terminal 170.

In a further optional step, the mobile terminal 170 transmits a list comprising information about said detected plurality of radio network nodes 130, 140 to the second radio network node 120.

In yet another optional step, the mobile terminal 170 transmits to the second radio network node 120 the determined timing estimates and physical cell identities, corresponding to each respective radio network node of the first set.

In yet a further optional step, the mobile terminal 170 estimates the position of the mobile terminal 170 based on the determined timing estimates. Optionally, the mobile terminal 170 determines the geographical position coordinates of itself base on the determined timing estimates.

In an optional step, the mobile terminal 170 transmits the estimated position to the second radio network node 120.

In some embodiments of the method in the mobile terminal 170, the determination of said timing estimates further is based on a matched filtering bank of a received positioning signal, the matched filter bank being based on the time-frequency position of the respective positioning signal. In this manner, the determination of said timing estimates may be performed efficiently and fast. Optionally, the determination of said timing estimates further is based on the first significant peak output from the matched filter bank. The peak output is compared to an estimated noise variance, and if the peak, i.e. the first significant peak, is sufficiently larger than the noise variance the signal is detected. The threshold can e.g. be selected such that the probability is low that an input signal consisting of noise only generates peaks above the threshold. Secondly, if more than one peak is above the threshold, then typically the first arrived peak is selected. However, it also needs to be checked that the first peak is not a side lobe peak of the autocorrelation of the desired signal. The side lobe peak size of the autocorrelation function may easily be determined in advance.

Figure 10:
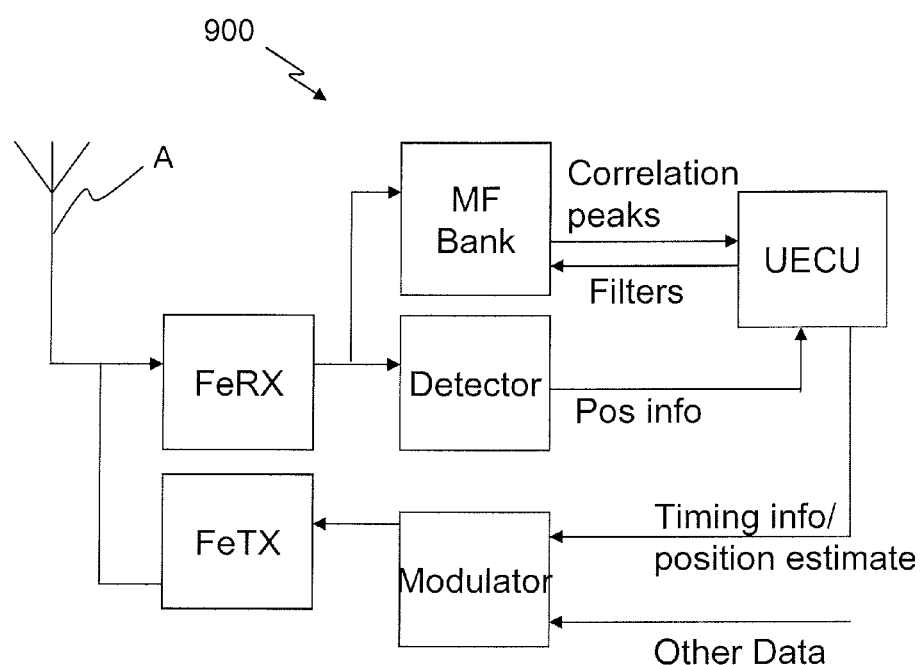
FIG. 10 shows a schematic block diagram of an embodiment of the arrangement in the mobile terminal for enabling estimation of the position of the mobile terminal.

Now with reference to FIG. 10, there is illustrated a schematic block diagram of an embodiment of the arrangement 900 in the mobile terminal 170 for enabling estimation of a position of a mobile terminal 170. A cellular radio communication system 100 comprises a second radio network node 120, at least two further radio network nodes 130, 140 and the mobile terminal 170. The mobile terminal 170 may be served by the second radio network node 120. A first set of radio network nodes may comprise the second network node 120 and said at least two further radio network nodes 130, 140. The arrangement 900 may comprise a receiving unit FeRX configured to receive from the second radio network node 120 information about each respective positioning signal to be received from each respective radio network node of the first set of radio network nodes 120, 130, 140, and to receive a respective positioning signal from each of the radio network nodes 120, 130, 140 of the first set. Furthermore, the arrangement 900 may comprise a processing unit UECU configured to determine a respective timing estimate, based on each of the received positioning signals, for each of the positioning signals. Each timing estimate is indicative of the distance between the respective radio network node 120, 130, 140 of the first set and the mobile terminal 170. Optionally, the arrangement 900 further comprises a transmitting unit FeTX.

In some embodiments of the arrangement 900 in the mobile terminal 170 for enabling estimation of a position of a mobile terminal 170, the processing unit UECU further is configured to detect a plurality of radio network nodes 130, 140. Said plurality of radio network nodes 130, 140 may be located in the vicinity of the mobile terminal 170 such that the respective positioning signal is transferrable between the each of the radio network nodes of the first set of radio network nodes and the mobile terminal 170.

In some embodiments of the arrangement 900 in the mobile terminal 170 for enabling estimation of a position of a mobile terminal 170, the transmitting unit FeTX further is configured to transmit a list comprising information about said detected plurality of radio network nodes 130, 140 to the second radio network node 120.

In some embodiments of the arrangement 900 in the mobile terminal 170 for enabling estimation of a position of a mobile terminal 170, the transmitting unit FeTX further is configured to transmit to the second radio network node 120 the determined timing estimates and physical cell identities, corresponding to each respective radio network node of the first set.

In some embodiments of the arrangement 900 in the mobile terminal 170 for enabling estimation of a position of a mobile terminal 170, the processing unit UECU further is configured to estimate the position of the mobile terminal 170 based on the determined timing estimates.

In some embodiments of the arrangement 900 in the mobile terminal 170 for enabling estimation of a position of a mobile terminal 170, the transmitting unit FeTX further is configured to transmit the estimated position to the second radio network node 120.

In some embodiments of the arrangement 900 in the mobile terminal 170 for enabling estimation of a position of a mobile terminal 170, the arrangement further comprises a matched filter bank of a received positioning signal, MF Bank, which the processing unit UEUC is configured to use for determination of said timing estimates. The matched filter bank may be based on the time-frequency position of the respective positioning signal. Optionally, the determination of said timing estimates further is based on the first significant peak output from the matched filter bank.

When operating the arrangement 900, a signal is received through the antenna A and converted to a baseband signal in the front end receiver FeRX, i.e. the receiving unit. Then, the signal is fed to a detector, detecting, for example, the positioning signal information. This information is then forwarded to a mobile terminal control unit UECU that determines the filter coefficient to be used by the matched filter bank, MF Bank. The MF Bank then correlates the received signal and reports detected correlation peaks. The control unit UECU then determines timing estimates for the different positioning signals, optionally the position estimate, and this information is multiplexed with other data, modulated and up-converted to a radio signal in the front end transmitter FeTX and transmitted via the antenna A to the serving base station (not shown in FIG. 10), such as the second radio network node 120 in FIG. 3.

Figure 11:
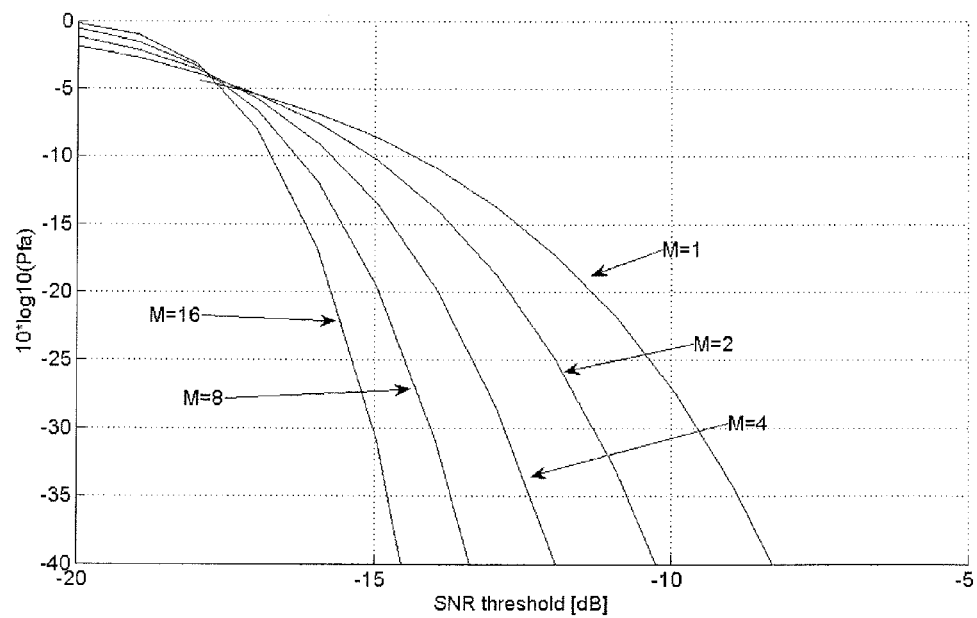
FIG. 11 shows a set of graphs of false alarm rate as a function of detected threshold SNR.

With reference to FIG. 11, there is shown a set of graphs of false alarm rate as a function of detected threshold SNR for synchronization signals. The false alarm rate is a measure of the probability that noise alone (when no signal is present) will produce a detection result higher than a threshold for signal detection. In the art, common values of the false alarm rate between 0.0001-0.001. In the Figure, the false alarm rate is plotted with a number M of accumulated synchronization frames as a design parameter. From the Figure, it can be seen that the false alarm rate seldom reach beyond −15 dB even for larger number of accumulations. In fact, when M approaches infinity, a limit of −18 dB is reached. This value is equal to the processing gain.

In a synchronized network, all base stations use a common time base for transmission. That means e.g. that a mobile terminal, located at equal distance to two base stations, will roughly observe the PSS/SSSs from these two base stations overlapping in time. So the interference will always be present and consisting of other PSS/SSS signals. One consequence of this is that accumulation of correlations from multiple frames to improve sensitivity may be less effective. This means that the cross-correlation properties become particularly interesting to investigate.

Figure 12:
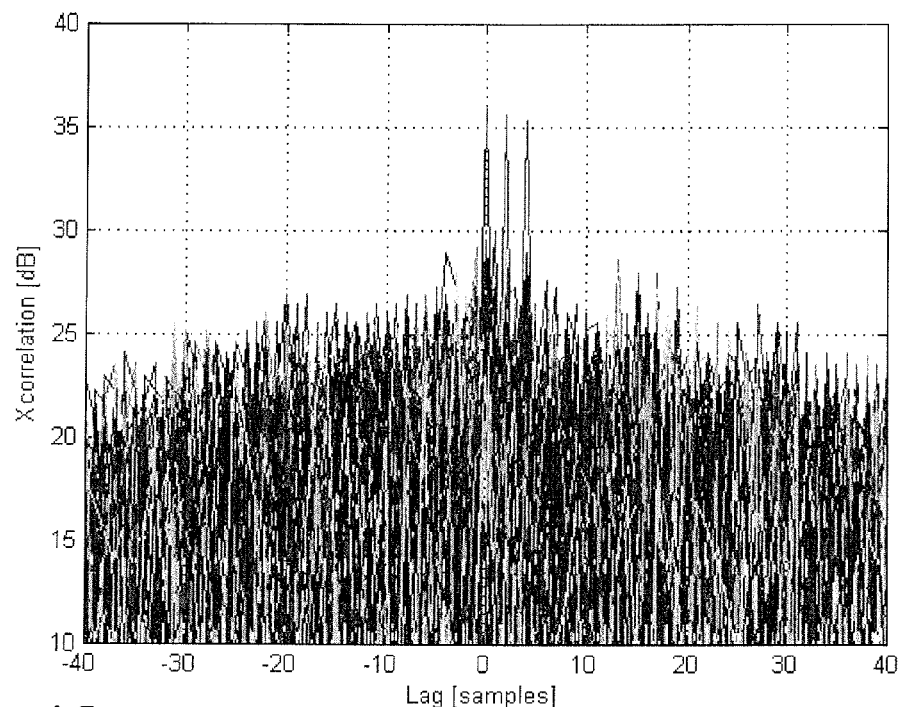
FIG. 12 shows cross-correlation properties of the SSS signals as function of lag.

In FIG. 12, the cross-correlation (X correlation) properties of the SSS sequences are shown as a function of lag. One SSS sequence is correlated against itself and all 503 other SSS sequences. The line with a peak at lag 0 is the desired signal. From FIG. 12, it may be seen that the isolation between this SSS and two other SSS sequences is not very good. This must be considered in planning the position signals. In addition, protection against other signals is also not very strong, only 8 dB which means that the targeted −15 dB can not be reached in presence of a dominant interferer, e.g. close to the serving cell, or the serving radio network node, such as the second radio network node.

To conclude, this indicates that experienced SINRs in a synchronized LTE network are too low to allow straightforward correlation methods using synchronization signals. Furthermore, the correlation properties of the synchronization signal also set a limit to the performance in interference limited scenarios. Measurements using Reference Signals may be a better option with respect to processing gain and cross-correlation issues. There are 8 Reference Symbols per resource block, meaning that for a 10 MHz system (50 resource blocks), a processing gain of 50*8=400=26 dB may be obtained, which means that theoretically, with infinite number of accumulations we can detect signals with SNR=−26 dB. However, since the same reference signal sequences are repeated every subframe, the cross-correlation peaks coming from interfering reference signals will limit the benefits of accumulated signals.

Therefore, the present inventors have proposed to use specific positioning signals as described herein.

In order to have good processing gain for detection of signals buried deep in the noise, the positioning signal sequences, i.e. the positioning signals, need to be of sufficient length. A processing gain of approximately 24 dB or more is desirable. By assuming the signal occupying all energy in at least two resource blocks (RBs) in frequency and one Transmission Time Interval (i.e. a "RB pair"), in total a processing gain of 11*12*2>24 dB is achieved. Furthermore, in another embodiment of the present invention the RBs are adjacent, implying simpler implementation of the matched filter in the mobile terminal. The signal sequences may be OFDM signals generated in frequency domain for instance QPSK signals, but the QPSK signals shall be chosen in the time-frequency grid such that desired time correlation properties are reached (for instance white noise pseudo-noise like performance). In another embodiment, the position signal sequences overlay the ordinary OFDM symbols over larger amount of RBs, but with lower effect, i.e. the positioning signals are overlaid CDMA signals.

Furthermore, the positioning signal sequences may preferably be repeated, for instance, every 5 or 10 ms in specific subframes to allow accumulation, either pre-defined or defined by the network node depending on certain characteristics, cell loads etc. Another desirable characteristic of the signal is that different positioning signal sequences may be transmitted for each transmission to avoid the problems with cross-correlation peaks.

Again, the PCI in combination with the sequential frame number may be used for determination of the positioning signal sequences to be transmitted in each subframe.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method in a first network node for enabling estimation of a position of a mobile terminal, wherein a cellular radio communication system comprises the first network node, a second radio network node, a plurality of radio network nodes and the mobile terminal, the second radio network node being managed by the first network node, the method comprising:
   receiving, via the second radio network node, a request for estimating the position of the mobile terminal;
   determining a first set of radio network nodes comprising the second radio network node and two additional radio network nodes, said two additional radio network nodes being selected among said plurality of radio network nodes;
   determining positioning signals for transmission from radio network nodes of the first set of radio network nodes to the mobile terminal, wherein each of the positioning signals is associated with a respective radio network node of the first set of radio network nodes;
   instructing each of the radio network nodes of the first set to transmit the positioning signal, associated therewith, to the mobile terminal;
   receiving, via the second radio network node, information for estimating the position of the mobile terminal from the mobile terminal; and
   estimating the position of the mobile terminal based on the received information,
   wherein the received information comprises information about timing estimates for each respective radio network node of the first set of network nodes and wherein each respective timing estimate is indicative of the distance between each respective radio network node and the mobile terminal;
   wherein determining positioning signals further comprises determining time-frequency positions for each of the positioning signals; and
   wherein the time-frequency position of each positioning signal is based on at least one of load at each respective radio network node of the first set and relative timing between network nodes of the first set of radio network nodes.

2. The method of claim 1, wherein two of the positioning signals, associated with two respective radio network nodes of the first set of radio network nodes, have a cross correlation below a predetermined threshold.

3. The method of claim 1, wherein determining a first set of radio network nodes is based on at least one of the first network node and the second radio network node.

4. The method of claim 1, wherein the mobile terminal-is served by the second radio network node.

5. The method of claim 1, wherein the request for estimating the position of the mobile terminal is received from the mobile terminal.

6. The method of claim 1, further comprising transmitting, via each of the radio network nodes of the first set, each of the determined positioning signals to the mobile terminal.

7. The method of claim 1, wherein the received information comprises information about the geographical position of the mobile terminal and wherein the geographical position is determined by the mobile terminal.

8. The method of claim 1:
   wherein determining the first set of network nodes further comprises receiving from the mobile terminal a list of radio network nodes detected by the mobile terminal; and
   wherein the determination of the first set of radio network nodes is based on the received list of detected radio network nodes.

9. The method of claim 8, wherein the list of radio network nodes is received in conjunction with the request for estimating the position of the mobile terminal.

10. The method of claim 1, wherein the determination of the time-frequency positions further is based on the physical cell identity for each respective radio network node of the first set of radio network nodes.

11. The method of claim 2, wherein the determination of the positioning signals is based on the physical cell identity for each respective radio network node of the first set of radio network nodes.

12. The method of claim 1, wherein at least one of the respective positioning signals is based on the subframe in which said at least one of the respective positioning signals is sent, whereby a respective positioning signal sent in one subframe differs from at least one respective positioning signal sent in another subframe.

13. The method of claim 1, wherein the first network node comprises a core network node.

14. An arrangement in a first network node for enabling estimation of a position of a mobile terminal, wherein a cellular radio communication system comprises the first network node, a second radio network node, a plurality of radio network nodes, and the mobile terminal, the second radio network node being managed by the first network node, the arrangement comprising:
 a receiving unit configured to receive, via the second radio network node, a request for estimating the position of the mobile terminal; and
 a processing unit configured to:
 determine a first set of radio network nodes comprising the second radio network node and two additional radio network nodes, wherein the two additional radio network nodes are selected among the plurality of radio network nodes;
 determine positioning signals for transmission from radio network nodes of the first set to the mobile terminal, wherein each of the positioning signals is associated with a respective radio network node of the first set;
 instruct each of the radio network nodes of the first set to transmit the positioning signal, associated therewith, to the mobile terminal;
 receive, via the second radio network node, information for estimating the position of the mobile terminal from the mobile terminal; and
 estimate the position of the mobile terminal based on the received information,
 wherein the received information comprises information about timing estimates for each respective radio network node of the first set of network nodes and wherein each respective timing estimate is indicative of the distance between each respective radio network node and the mobile terminal;
 wherein determining positioning signals further comprises determining time-frequency positions for each of the positioning signals; and
 wherein the time-frequency position of each positioning signal is based on at least one of load at each respective radio network node of the first set and relative timing between network nodes of the first set of radio network nodes.

15. A method in a second radio network node for enabling estimation of a position of a mobile terminal, the method comprising:
 determining a positioning signal, associated with a second radio network node, for transmission from the second radio network node to a mobile terminal,
 wherein the second radio network node and the mobile terminal are in a cellular radio communication system, the mobile terminal is located in the vicinity of the second radio network node such that the positioning signal is transferrable between the second radio network node and the mobile terminal; and
 wherein the positioning signal includes timing estimates indicative of a distance between the second radio network node and the mobile terminal;
 transmitting the positioning signal including the timing estimates to the mobile terminal, wherein the cellular radio communication system further comprises a first network node; and
 receiving from the first network node instructions to transmit the positioning signal,
 wherein determining positioning signals further comprises determining time-frequency positions for each of the positioning signals; and
 wherein the time-frequency position of each positioning signal is based on at least one of load at each respective radio network node of the first set and relative timing between network nodes of the first set of radio network nodes.

16. The method of claim 15, wherein determining a positioning signal comprises receiving from the first network node a time-frequency position for the transmission of the positioning signal.

17. The method of claim 15, wherein the cellular radio communication system further comprises two additional radio network nodes, wherein determining a positioning signal further comprises:
 determining a first set of radio network nodes comprising the second radio network node and said two additional radio network nodes; and
 determining positioning signals for transmission from radio network nodes of the first set of radio network nodes to the mobile terminal, wherein each of the positioning signals is associated with a respective radio network node of the first set of radio network nodes.

18. The method of claim 17, wherein determining a first set of radio network nodes is based on the second radio network node.

19. The method of claim 17, wherein the mobile terminal-is served by the second radio network node.

20. The method of claim 17, wherein determining positioning signals further comprises determining a time-frequency position for each of the positioning signals.

21. The method of claim 17, wherein two of the positioning signals, associated with two respective radio network nodes of the first set of radio network nodes, have a cross correlation below a predetermined threshold.

22. The method of claim 17, wherein the second radio network node comprises an eNodeB.

23. An arrangement in a second radio network node for enabling estimation of a position of a mobile terminal the arrangement comprising:
 a processing unit configured to determine a positioning signal, associated with a second radio network node, for transmission from the second radio network node to a mobile terminal,
 wherein the second radio network node and the mobile terminal are in a cellular radio communication system, the mobile terminal is located in the vicinity of the second radio network node such that the positioning signal is transferrable between the second radio network node and the mobile terminal; and
 wherein the positioning signal includes timing estimates indicative of a distance between the second radio network node and the mobile terminal; and a transmitting unit configured to transmit the positioning signal including the timing estimates to the mobile terminal, wherein the cellular radio communication system further comprises a first network node that provides instructions to transmit the positioning signal;

wherein determining positioning signals further comprises determining time-frequency positions for each of the positioning signals; and wherein the time-frequency position of each positioning signal is based on at least one of load at each respective radio network node of the first set and relative timing between network nodes of the first set of radio network nodes.

24. A method in a mobile terminal for enabling estimation of a position of a mobile terminal, wherein a cellular radio communication system-comprises a second radio network node, the method comprising:

receiving from the second radio network node information about each respective positioning signal to be received from each respective radio network node of the first set of radio network nodes, wherein the cellular radio communication system further comprises at least two additional radio network nodes and the mobile terminal, the mobile terminal being served by the second radio network node, a first set of radio network nodes including the second network node and the at least two additional radio network nodes;

receiving a respective positioning signal from each of the radio network nodes of the first set of radio network nodes;

determining a respective timing estimate, based on each of the received positioning signals, for each of the positioning signals, wherein each timing estimate is indicative of the distance between the respective radio network node of the first set of radio network nodes and the mobile terminal; and estimating the position of the mobile terminal based on the determined timing estimates, wherein determining positioning signals further comprises determining time-frequency positions for each of the positioning signals; and wherein the time-frequency position of each positioning signal is based on at least one of load at each respective radio network node of the first set and relative timing between network nodes of the first set of radio network nodes.

25. The method of claim 24, further comprising:

detecting a plurality of radio network nodes, wherein said plurality of radio network nodes are located in the vicinity of the mobile terminal such that the respective positioning signal is transferrable between the each of the radio network nodes of the first set of radio network nodes and the mobile terminal; and transmitting a list comprising information about said detected plurality of radio network nodes to the second radio network node.

26. The method of claim 24, further comprising transmitting to the second radio network node-the determined timing estimates and physical cell identities, corresponding to each respective radio network node of the first set.

27. The method of claim 24, further comprising transmitting the determined position to the second radio network node.

28. The method of claim 24, wherein the determination of said timing estimates is based on a matched filtering bank of a received positioning signal, the matched filter bank being based on the time-frequency position of the respective positioning signal.

29. The method of claim 28, wherein the determination of said timing estimates is based on the first significant peak output from the matched filter bank.

30. An arrangement in a mobile terminal for enabling estimation of a position of a mobile terminal, the arrangement comprising:

a receiving unit configured to receive from the second radio network node information about each respective positioning signal to be received from each respective radio network node of the first set of radio network nodes, and to receive a respective positioning signal from each of the radio network nodes of a first set, wherein the second radio network node, at least two further radio network nodes and the mobile terminal are includes in a cellular radio communication system, the mobile terminal is served by the second radio network node, and the first set of radio network nodes comprising the second network node and the at least two radio network nodes; and a processing unit configured to determine a respective timing estimate, based on each of the received positioning signals, for each of the positioning signals, wherein each timing estimate is indicative of the distance between the respective radio network node of the first set and the mobile terminal, wherein determining positioning signals further comprises determining time-frequency positions for each of the positioning signals; and wherein the time-frequency position of each positioning signal is based on at least one of load at each respective radio network node of the first set and relative timing between network nodes of the first set of radio network nodes.

* * * * *

UNITED STATES PATENT AND TRADEMARK OFFICE
CERTIFICATE OF CORRECTION

PATENT NO. : 8,437,775 B2
APPLICATION NO. : 13/260524
DATED : May 7, 2013
INVENTOR(S) : Lindoff et al.

It is certified that error appears in the above-identified patent and that said Letters Patent is hereby corrected as shown below:

On the title page, in item (75), under "Inventors", in Column 1, Line 2, delete "Södrasandby" and insert -- Södra sandby --, therefor.

In the Specification

In Column 2, Line 33, in Equation (1a), delete "$t_R^1 = t_T^1 + \sqrt{(x-x_1)^2 + (y-y_1)^2}/c - b + v^1$" and insert -- $t_R^1 = t_T^1 + \sqrt{(x-x_1)^2 + (y-y_1)^2}/c + b + v^1$ --, therefor.

In Column 2, Line 33, in Equation (1b), delete "$t_R^2 = t_T^2 + \sqrt{(x-x_2)^2 + (y-y_2)^2}c/+b+v^2$" and insert -- $t_R^2 = t_T^2 + \sqrt{(x-x_2)^2 + (y-y_2)^2}/c + b + v^2$ --, therefor.

In Column 2, Line 36, in Equation (1N), delete "$t_R^N = t_T^N + \sqrt{(x-x_N)^2 + (y-y_N)^2}c/+b+v^N$" and insert -- $t_R^N = t_T^N + \sqrt{(x-x_N)^2 + (y-y_N)^2}/c + b + v^N$ --, therefor.

Signed and Sealed this
Twenty-fourth Day of December, 2013

Margaret A. Focarino
*Commissioner for Patents of the United States Patent and Trademark Office*